US008072723B2

(12) United States Patent
Premerlani et al.

(10) Patent No.: US 8,072,723 B2
(45) Date of Patent: Dec. 6, 2011

(54) RESETTABLE MEMS MICRO-SWITCH ARRAY BASED ON CURRENT LIMITING APPARATUS

(75) Inventors: William James Premerlani, Scotia, NY (US); Robert Joseph Caggiano, Wolcott, CT (US); Kanakasabapathi Subramanian, Clifton Park, NY (US); Brent Charles Kumfer, Farmington, CT (US); Charles Stephan Pitzen, Avon, CT (US); David James Lesslie, Plainville, CT (US); Joshua Isaac Wright, Arlington, VA (US); Parag Thakre, Bangalore (IN)

(73) Assignee: General Electric Company, Schenectady, NY (US)

( * ) Notice: Subject to any disclaimer, the term of this patent is extended or adjusted under 35 U.S.C. 154(b) by 1101 days.

(21) Appl. No.: 11/764,908

(22) Filed: Jun. 19, 2007

(65) Prior Publication Data

US 2008/0316664 A1 Dec. 25, 2008

(51) Int. Cl.
*H02H 3/00* (2006.01)
*H02H 3/20* (2006.01)
*H02H 9/04* (2006.01)
*H02H 9/08* (2006.01)

(52) U.S. Cl. .......................... 361/87; 361/91.1; 361/93.9

(58) Field of Classification Search ..................... 361/87
See application file for complete search history.

(56) References Cited

U.S. PATENT DOCUMENTS 3,496,409 A 2/1970 Connell .......................... 315/36
4,384,289 A 5/1983 Stillwell et al.
4,723,187 A 2/1988 Howell
4,827,272 A 5/1989 Davis
4,847,780 A 7/1989 Gilker et al.
5,374,792 A 12/1994 Ghezzo et al.
5,426,360 A 6/1995 Maraio et al.
5,430,597 A 7/1995 Bagepalli et al. ............... 361/93
5,454,904 A 10/1995 Ghezzo et al.
5,502,374 A 3/1996 Cota
5,889,643 A 3/1999 Elms
5,940,260 A 8/1999 Gelbien et al.
5,943,223 A 8/1999 Pond (Continued)

FOREIGN PATENT DOCUMENTS

DE 19850397 A1 5/2000

(Continued)

OTHER PUBLICATIONS

"Power Circuit Breaker Using Micro-Mechanical Switches"; Authors: George G. Karady and Gerald Thomas Heydt; Int J. Critical Infrastructure, vol. 3, Nos. 1/2, 2007; pp. 88-100; XP008087882.

(Continued)

*Primary Examiner* — Dharti Patel
(74) *Attorney, Agent, or Firm* — Cantor Colburn LLP

(57) ABSTRACT

The present invention comprises a method for over-current protection. The method comprising monitoring a load current value of a load current passing through a plurality of micro-electromechanical switching system devices, determining if the monitored load current value varies from a predetermined load current value, and generating a fault signal in the event that the monitored load current value varies from the predetermined load current value. The method also comprises diverting the load current from the plurality of micro-electromechanical switching system devices in response to the fault signal and determining if the variance in the load current value was due to a true fault trip or a false nuisance trip.

15 Claims, 5 Drawing Sheets

U.S. PATENT DOCUMENTS

| | | | | |
|---|---|---|---|---|
| 5,953,180 | A * | 9/1999 | Frater et al. | 360/97.02 |
| 5,953,189 | A * | 9/1999 | Abot et al. | 361/13 |
| 5,973,896 | A | 10/1999 | Hirsh et al. | |
| 6,054,659 | A | 4/2000 | Lee et al. | |
| 6,275,366 | B1 | 8/2001 | Gelbien et al. | |
| 6,563,683 | B1 | 5/2003 | Strumpler | 361/93.1 |
| 6,671,149 | B1 * | 12/2003 | Chea et al. | 361/87 |
| 6,738,246 | B1 * | 5/2004 | Strumpler | 361/93.1 |
| 6,904,471 | B2 | 6/2005 | Boggs et al. | 710/8 |
| 2001/0014949 | A1 | 8/2001 | Leblanc | |
| 2002/0008149 | A1 | 1/2002 | Riley et al. | |
| 2002/0145841 | A1 | 10/2002 | Williams et al. | |
| 2003/0050737 | A1 | 3/2003 | Osann, Jr. | |
| 2003/0107860 | A1 * | 6/2003 | Dougherty | 361/62 |
| 2003/0212473 | A1 | 11/2003 | Vandevanter | |
| 2004/0032320 | A1 | 2/2004 | Zalitzky et al. | |
| 2004/0113713 | A1 | 6/2004 | Zipper et al. | |
| 2004/0263125 | A1 | 12/2004 | Kanno et al. | |
| 2005/0085928 | A1 | 4/2005 | Shani | 700/18 |
| 2005/0248340 | A1 | 11/2005 | Berkcan et al. | 324/259 |
| 2005/0270014 | A1 | 12/2005 | Zribi et al. | |
| 2006/0121785 | A1 | 6/2006 | Caggiano et al. | |
| 2006/0187688 | A1 | 8/2006 | Tsuruya | 363/56.12 |
| 2006/0202933 | A1 | 9/2006 | Pasch et al. | 345/94 |
| 2007/0013357 | A1 | 1/2007 | Huang et al. | 323/318 |
| 2007/0057746 | A1 | 3/2007 | Rubel | |
| 2007/0142938 | A1 | 6/2007 | Huang | 700/40 |
| 2007/0173960 | A1 | 7/2007 | Kumar | 700/40 |

FOREIGN PATENT DOCUMENTS

| | | | |
|---|---|---|---|
| DE | 19927762 | A1 | 1/2001 |
| EP | 0072422 | A1 | 2/1983 |
| EP | 0233756 | A1 | 8/1987 |
| EP | 0774822 | A1 | 5/1997 |
| EP | 1255268 | A1 | 11/2002 |
| EP | 1610142 | A1 | 12/2005 |
| EP | 1643324 | A2 | 4/2006 |
| EP | 1681694 | A1 | 7/2006 |
| GB | 2123627 | A | 2/1984 |
| WO | 9946606 | A2 | 9/1999 |
| WO | 0004392 | A1 | 1/2000 |
| WO | 2006078944 | A2 | 7/2006 |
| WO | 2006100192 | A1 | 9/2006 |

OTHER PUBLICATIONS

"MEMS Based Electronic Circuit Breaker as a Possible Component for and Electrical Ship", Authors: George G. Karady and Gerald T. Heydt; IEEE Electric Ship Technologies Symposium, 2005; pp. 214-218; XP-002468154.

"Advanced MEMS for High Power Integrated Distribution Systems"; Authors: Rahim Kasim, Bruce C. Kim and Josef Drobnik; IEEE Computer; Proceedings of the International Conference on MEMS, NANO and Smart Systems, 2005; pp. 1-8.

PCT International Search Report; International Application No. PCT/US2007/014379; International Filing Date Jun. 20, 2007; Date of Mailing Feb. 11, 2008.

PCT International Search Report; International Application No. PCT/US2007/071644; International Filing Date Jun. 20, 2007; Date of Mailing Feb. 13, 2008.

PCT International Search Report; International Application No. PCT/US2007/071624; International Filing Date Jun. 20, 2007; Date of Mailing Feb. 18, 2008.

PCT International Search Report; International Application No. PCT/US2007/071627; International Filing Date Jun. 20, 2007; Date of Mailing Feb. 29, 2008.

PCT International Search Report; International Application No. PCT/US2007/071630; International Filing Date Jun. 20, 2007; Date of Mailing Mar. 7, 2008.

PCT Written Opinion of the International Searching Authority; International Application No. PCT/US2007/071630; International Filing Date Jun. 20, 2007; Date of Mailing Mar. 7, 2008.

PCT International Search Report; International Application No. PCT/US2007/071632; International Filing Date Jun. 20, 2007; Date of Mailing Feb. 29, 2008.

PCT Written Opinion of the International Searching Authority; International Application No. PCT/US2007/071632; International Filing Date Jun. 20, 2007; Date of Mailing Feb. 29, 2008.

PCT International Search Report; International Application No. PCT/US2007/014363; International Filing Date Jun. 20, 2007; Date of Mailing Mar. 4, 2008.

PCT International Search Report; International Application No. PCT/US2007/071656; International Filing Date Jun. 20, 2007; Date of Mailing Mar. 12, 2008.

PCT International Search Report; International Application No. PCT/US2007/071654; International Filing Date Jun. 20, 2007; Date of Mailing Mar. 13, 2008.

PCT International Search Report; International Application No. PCT/US2007/014362; International Filing Date Jun. 20, 2007; Date of Mailing Mar. 20, 2008.

PCT International Search Report; International Application No. PCT/US2007/071643; International Filing Date Jun. 20, 2007; Date of Mailing Feb. 8, 2008.

PCT Written Opinion of the International Searching Authority; International Application No. PCT/US2007/071643; International Filing Date Jun. 20, 2007; Date of Mailing Feb. 8, 2008.

George G. Karady and G.T. Heydt, "Novel Concept for Medium Voltage Circuit Breakers Using Microswitches," IEEE Transactions on Power Delivery, vol. 21, No. 1, Jan. 2006.

USPTO Office Action dated Oct. 17, 2008; Filing Date: Jun. 19, 2007; First Named Inventor: William James Premerlani; Confirmation No. 6421.

USPTO Office Action dated Oct. 24, 2008; Filing Date: Jun. 15, 2007; First Named Inventor: William James Permerlani; Confirmation No. 4167.

USPTO Office Action dated Oct. 28, 2008; Filing Date: Jun. 8, 2007; First Named Inventor: Cecil Rivers, Jr.; Confirmation No. 7895.

European Search Report for European Application No. 07110554.8; European Filing Date of Oct. 19, 2007; Mailing Date of Oct. 30, 2007; (6 pgs).

* cited by examiner

RESETTABLE MEMS MICRO-SWITCH ARRAY BASED ON CURRENT LIMITING APPARATUS

BACKGROUND OF THE INVENTION

Embodiments of the invention relate generally to a switching device for switching off a current in a current path, and more particularly to micro-electromechanical system based switching devices.

To protect against fire and equipment damage, electrical equipment and wiring must be protected from conditions that result in current levels above their ratings. Over-current conditions are classified by the time required before damage occurs and are grouped into two categories: timed over-currents and instantaneous over-currents.

Timed over-current faults are the less severe variety and require the protective equipment to deactivate the circuit after a given time period, which depends on the level of the fault. Timed over-current faults are typically current levels just above rated and up to 8-10 times rated. The system cabling and equipment can handle these faults for a period of time but the protective equipment should deactivate the circuit if the current levels don't recede. Typically timed faults result from either mechanically overloaded equipment or high impedance paths between opposite polarity lines—line to line, line to ground, or line to neutral.

Instantaneous over-currents, also termed short circuit faults, are severe faults and involve current levels of 8-10 time rated current and above. These faults result from low impedance paths between opposite polarity lines—line to line, line to ground, or line to neutral—and need to be removed from the system immediately. Short circuit faults involve extreme currents and can be extremely damaging to equipment and dangerous to personnel. The longer these faults persist on the system the more energy is released and the more damage occurs, it is of vital importance to minimize the response time and thus the let-through energy during a short circuit fault.

A circuit breaker is an electrical device designed to protect electrical equipment from damage caused by faults in the circuit. Traditionally, most conventional circuit breakers include bulky electromechanical switches. Unfortunately, these conventional circuit breakers are large in size thereby necessitating use of a large force to activate the switching mechanism. Additionally, the switches of these circuit breakers generally operate at relatively slow speeds. Further, these circuit breakers are disadvantageously complex to build, and thus expensive to fabricate. In addition, when contacts of a switching mechanism within a conventional circuit breaker are physically separated, an arc is typically formed between the contacts and continues to carry current until the current in the circuit ceases. Moreover, energy associated with the arc is generally undesirable to both equipment and personnel.

A contactor is an electrical device that is designed to switch an electrical load ON and OFF upon command. Traditionally, electromechanical contactors are employed in control gear, where the electromechanical contactors are capable of handling switching currents up to their interrupting capacity. Electromechanical contactors may also find application in power systems for switching currents. However, fault currents in power systems are typically greater than the interrupting capacity of the electromechanical contactors. Accordingly, to employ electromechanical contactors in power system applications it may be desirable to protect the contactor from damage by backing it up with a series device that is sufficiently last acting to interrupt fault currents prior to the contactor opening at all values of current above the interrupting capacity of the contactor.

Electrical systems presently use either a fuse or a circuit breaker to perform over-current protection. Fuses rely on heating effects (i.e., $I^2t$) to operate. They are designed as weak points in the circuit and each successive fuse closer to the load must be rated for smaller & smaller currents. In a short circuit condition all upstream fuses see the same heating energy and the weakest one, by design the closest to the fault, will be the first to operate. Fuses however are one-time devices and must be replaced after a fault occurs.

Previously conceived solutions to facilitate use of contactors in power systems have include vacuum contactors, vacuum interrupters and air break contactors. Unfortunately, contactors such as vacuum contactors do not lend themselves to easy visual inspection as the contactor tips are encapsulated in a sealed, evacuated enclosure. Further, while the vacuum contactors are well suited for handling the switching of large motors, transformers and capacitors, they are known to cause damaging transient over voltages, particularly when the load is switched off.

Further, electromechanical contactors generally use mechanical switches. However, as these mechanical switches tend to switch at a relatively slow speed predictive techniques are required in order to estimate occurrence of a zero crossing, often tens of milliseconds before the switching event is to occur. Such zero crossing prediction is prone to error as many transients may occur in this time.

As an alternative to slow mechanical and electromechanical switches, fast solid-state switches have been employed in high speed switching applications. As will be appreciated, these solid-state switches switch between a conducting state and a non-conducting state through controlled application of a voltage or bias. For example, by reverse biasing a solid-state switch, the switch may be transitioned into a non-conducting state. However, since solid-state switches do not create a physical gap between contacts when they are switched into a non-conducing state, they experience leakage current. Further, due to internal resistances, when solid-state switches operate in a conducting state, they experience a voltage drop. Both the voltage drop and leakage current contribute to the generation of excess heat under normal operating circumstances, which may be detrimental to switch performance and life. Moreover, due at least in part to the inherent leakage current associated with solid-state switches, their use in circuit breaker applications is not possible.

BRIEF DESCRIPTION OF THE INVENTION

Exemplary embodiments of the present invention comprise a method for over-current protection. The method comprising monitoring a load current value of a load current passing through a plurality of micro-electromechanical switching system devices, determining if the monitored load current value varies from a predetermined load current value, and generating a fault signal in the event that the monitored load current value varies from the predetermined load current value. The method also comprises diverting the load current from the plurality of micro-electromechanical switching system devices in response to the fault signal and determining if the variance in the load current value was due to a true fault trip or a false nuisance trip.

Another exemplary embodiment of the present invention comprises an over-current protective device for electrical distribution systems. The device comprising a user interface, wherein the user interface is configured to receive input control commands, the user interface further comprising a terminal block in communication with a disconnect switch, a logic circuit in communication with the user interface, and a power stage circuit in communication with the logic circuit. The device also comprises an MEMS protection circuit in communication with the logic circuit and the power staging circuit and a switching circuit in communication with the MEMS protection circuit, wherein the switching circuit comprises a plurality of micro-electromechanical system switching devices.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, well known methods, procedures, and components have not been described in detail.

Figure 1:
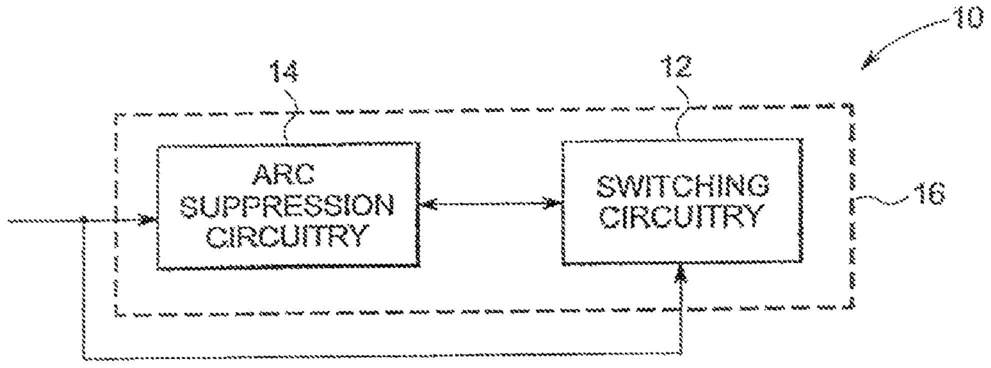
FIG. 1 is a block diagram of an exemplary MEMS based switching system in accordance with an embodiment of the invention.

Further, various operations may be described as multiple discrete steps performed in a manner that is helpful for understanding embodiments of the present invention. However, the order of description should not be construed as to imply that these operations need be performed in the order they are presented, or that they are even order dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated. FIG. 1 illustrates a block diagram of an exemplary arc-less MEMS based switching system 10, in accordance with aspects of the present invention. Presently, MEMSs generally refers to micron-scale structures that, for example, can integrate a multiplicity of functionally distinct elements. Such elements including, but not being limited to, mechanical elements, electromechanical elements, sensors, actuators, and electronics, on a common substrate through micro-fabrication technology. It is contemplated, however, that many techniques and structures presently available in MEMS devices will in just a few years be available via nanotechnology-based devices, that is, structures that may be smaller than 100 nanometers in size. Accordingly, even though example embodiments described throughout this document may refer to MEMS-based switching devices, it is submitted that the inventive aspects of the present invention should be broadly construed and should not be limited to micron-sized devices.

As illustrated in FIG. 1, the arc-less MEMS based switching system 10 is shown as including MEMS based switching circuitry 12 and arc suppression circuitry 14, where the arc suppression circuitry 14 (alternatively referred to Hybrid Arcless Limiting Technology (HALT)), is operatively coupled to the MEMS based switching circuitry 12. Within exemplary embodiments of the present invention, the MEMS based switching circuitry 12 may be integrated in its entirety with the arc suppression circuitry 14 in a single package 16. In further exemplary embodiments, only specific portions or components of the MEMS based switching circuitry 12 may be integrated in conjunction with the arc suppression circuitry 14.

In a presently contemplated configuration as will be described in greater detail with reference to FIG. 2, the MEMS based switching circuitry 12 may include one or more MEMS switches. Additionally, the arc suppression circuitry 14 may include a balanced diode bridge and a pulse circuit. Further, the arc suppression circuitry 14 may be configured to facilitate suppression of an arc formation between contacts of the one or more MEMS switches. It may be noted that the arc suppression circuitry 14 may be configured to facilitate suppression of an arc formation in response to an alternating current (AC) or a direct current (DC).

Figure 2:
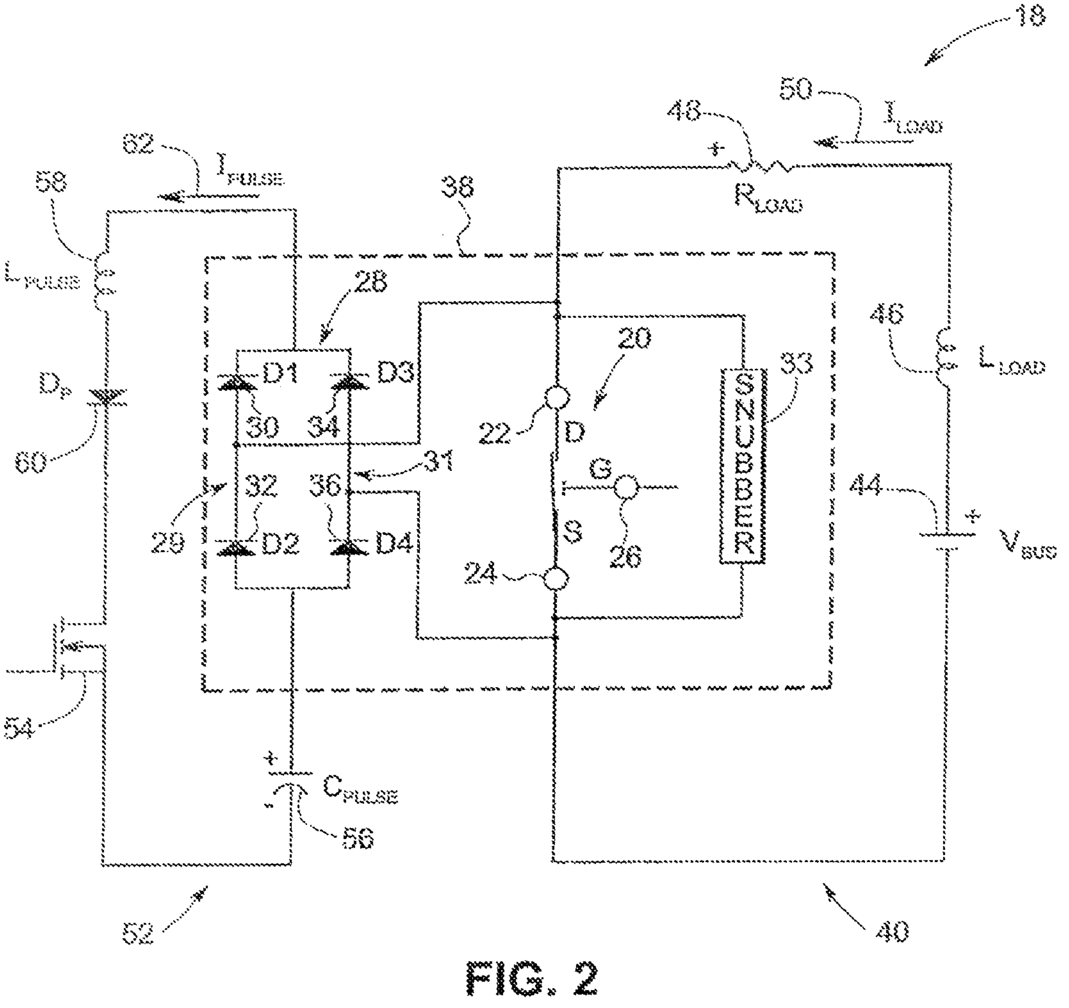
FIG. 2 is schematic diagram illustrating the exemplary MEMS based switching system depicted in FIG. 1.

Turning now to FIG. 2, a schematic diagram 18 of the exemplary arc-less MEMS based switching system depicted in FIG. 1 is illustrated in accordance with an embodiment. As noted with reference to FIG. 1, the MEMS based switching circuitry 12 may include one or more MEMS switches, in the illustrated exemplary embodiment a first MEMS switch 20 is depleted as having a first contact 22, a second contact 24 and a third contact 26. In one embodiment the first contact 22 may be configured as a drain, the second contact 24 may be configured as a source and the third contact 26 may be configured as a gate. Further, as illustrated in FIG. 2, a voltage snubber circuit 33 may be coupled in parallel with the MEMS switch 20 and configured to limit voltage overshoot during fast contact separation as will be explained in greater detail hereinafter. In further embodiments, the snubber circuit 33 may include a snubber capacitor (see 76, FIG. 4) coupled in series with a snubber resistor (see FIG. 4, reference number 78). The snubber capacitor may facilitate improvement in transient voltage sharing during the sequencing of the opening of the MEMS switch 20. Additionally, the snubber resistor may suppress any pulse of current generated by the snubber capacitor during closing operation of the MEMS switch 20. In yet further embodiments, the voltage snubber circuit 33 may include a metal oxide varistor (MOV) (not shown).

In accordance with further aspects of the present technique, a load circuit 40 may be coupled in series with the first MEMS switch 20. The load circuit 40 may include a voltage source $V_{BUS}$ 44. In addition, the load circuit 40 may also include a load inductance 46 $L_{LOAD}$, where the load inductance $L_{LOAD}$ 46 is representative of a combined load inductance and a bus inductance viewed by the load circuit 40. The load circuit 40 may also include a load resistance $R_{LOAD}$ 48 representative of a combined load resistance viewed by the load circuit 40. Reference numeral 50 is representative of a load circuit current $I_{LOAD}$ that may flow through the load circuit 40 and the first MEMS switch 20.

As noted with reference to FIG. 1, the arc suppression circuitry 14 may include a balanced diode bridge. In the illustrated embodiment, a balanced diode bridge 28 is depleted as having a first branch 29 and a second branch 31. As used herein, the term “balanced diode bridge” is used to represent a diode bridge that is configured in such a manner that voltage drops across both the first and second branches 29, 31 are substantially equal. The first branch 29 of the balanced diode bridge 28 may include a first diode D1 30 and a second diode D2 32 coupled together to form a first series circuit. In a similar fashion, the second branch 31 of the balanced diode bridge 28 may include a third diode D3 34 and a fourth diode D4 36 operatively coupled together to form a second series circuit.

In an exemplary embodiment, the first MEMS switch 20 may be coupled in parallel across midpoints of the balanced diode bridge 28. The midpoints of the balanced diode bridge may include a first midpoint located between the first and second diodes 30, 32 and a second midpoint located between the third and fourth diodes 34, 36. Further, the first MEMS switch 20 and the balanced diode bridge 28 may be tightly packaged to facilitate minimization of parasitic inductance caused by the balanced diode bridge 28 and in particular, the connections to the MEMS switch 20. It must be noted that, in accordance with exemplary aspects of the present technique, the first MEMS switch 20 and the balanced diode bridge 28 are positioned relative to one another such that the inherent inductance between the first MEMS switch 20 and the balanced diode bridge 28 produces a di/dt voltage less than a few percent of the voltage across the drain 22 and source 24 of the MEMS switch 20 when carrying a transfer of the load current to the diode bridge 28 during the MEMS switch 20 turn-off which will be described in greater detail hereinafter. In further embodiments, the first MEMS switch 20 may be integrated with the balanced diode bridge 28 in a single package 38 or optionally within the same die with the intention of minimizing the inductance interconnecting the MEMS switch 20 and the diode bridge 28.

Additionally, the arc suppression circuitry 14 may include a pulse circuit 52 operatively coupled in association with the balanced diode bridge 28. The pulse circuit 52 may be configured to detect a switch condition and initiate opening of the MEMS switch 20 responsive to the switch condition. As used herein, the term “switch condition” refers to a condition that triggers changing a present operating state of the MEMS switch 20. For example, the switch condition may result in changing a first closed state of the MEMS switch 20 to a second open state or a first open state of the MEMS switch 20 to a second closed state. A switch condition may occur in response to a number of actions including but not limited to a circuit fault or switch ON/OFF request.

The pulse circuit 52 may include a pulse switch 54 and a pulse capacitor $C_{PULSE}$ 56 series coupled to the pulse switch 54. Further, the pulse circuit may also include a pulse inductance $L_{PULSE}$ 58 and a first diode $D_P$ 60 coupled in series with the pulse switch 54. The pulse inductance $L_{PULSE}$ 58, the diode $D_P$ 60, the pulse switch 54 and the pulse capacitor $C_{PULSE}$ 56 may be coupled in series to form a first branch of the pulse circuit 52, where the components of the first branch may be configured to facilitate pulse current shaping and timing. Also, reference numeral 62 is representative of a pulse circuit current $I_{PULSE}$ that may flow through the pulse circuit 52.

In accordance with aspects of the present invention, the MEMS switch 20 may be rapidly switched (for example, on the order of picoseconds or nanoseconds) from a first closed state to a second open state while carrying a current albeit at a near-zero voltage. This may be achieved through the combined operation of the load circuit 40, and pulse circuit 52 including the balanced diode bridge 28 coupled in parallel across contacts of the MEMS switch 20.

Figure 3:
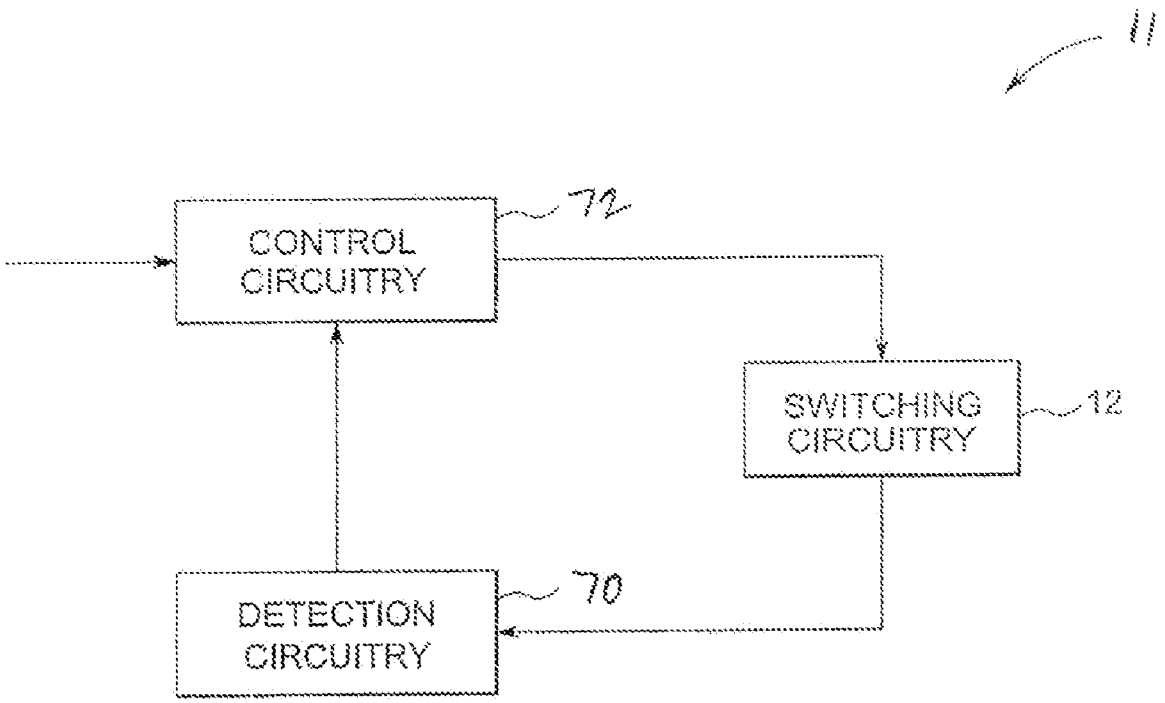
FIG. 3 is a block diagram of an exemplary MEMS based switching system in accordance with an embodiment of the invention and alternative to the system depicted in FIG. 1.

Reference is now made to FIG. 3, which illustrates a block diagram of an exemplary soft switching system 11, in accordance with aspects of the present invention. As illustrated in FIG. 3, the soft switching system 11 includes switching circuitry 12, detection circuitry 70, and control circuitry 72 operatively coupled together. The detection circuitry 70 may be coupled to the switching circuitry 12 and configured to detect an occurrence of a zero crossing of an alternating source voltage in a load circuit (hereinafter “source voltage”) or an alternating current in the load circuit (hereinafter referred to as “load circuit current”). The control circuitry 72 may be coupled to the switching circuitry 12 and the detection circuitry 70, and may be configured to facilitate arc-less switching of one or more switches in the switching circuitry 12 responsive to a detected zero crossing of the alternating source voltage or the alternating load circuit current. In one embodiment, the control circuitry 72 may be configured to facilitate arc-less switching of one or more MEMS switches comprising at least part of the switching circuitry 12.

In accordance with one aspect of the invention, the soft switching system 11 may be configured to perform soft or point-on-wave (PoW) switching whereby one or more MEMS switches in the switching circuitry 12 may be closed at a time when the voltage across the switching circuitry 12 is at or very close to zero and opened at a time when the current through the switching circuitry 12 is at or close to zero. By closing the switches at a time when the voltage across the switching circuitry 12 is at or very close to zero, pre-strike arcing can be avoided by keeping the electric field low between the contacts of the one or more MEMS switches as they close; even if multiple switches do not all close at the same time. Similarly, by opening the switches at a time when the current through the switching circuitry 12 is at or close to zero, the soft switching system 11 can be designed so that the current in the last switch to open in the switching circuitry 12 falls within the design capability of the switch. As mentioned above, the control circuitry 72 may be configured to synchronize the opening and closing of the one or more MEMS switches of the switching circuitry 12 with the occurrence of a zero crossing of an alternating source voltage or an alternating load circuit current.

Figure 4:
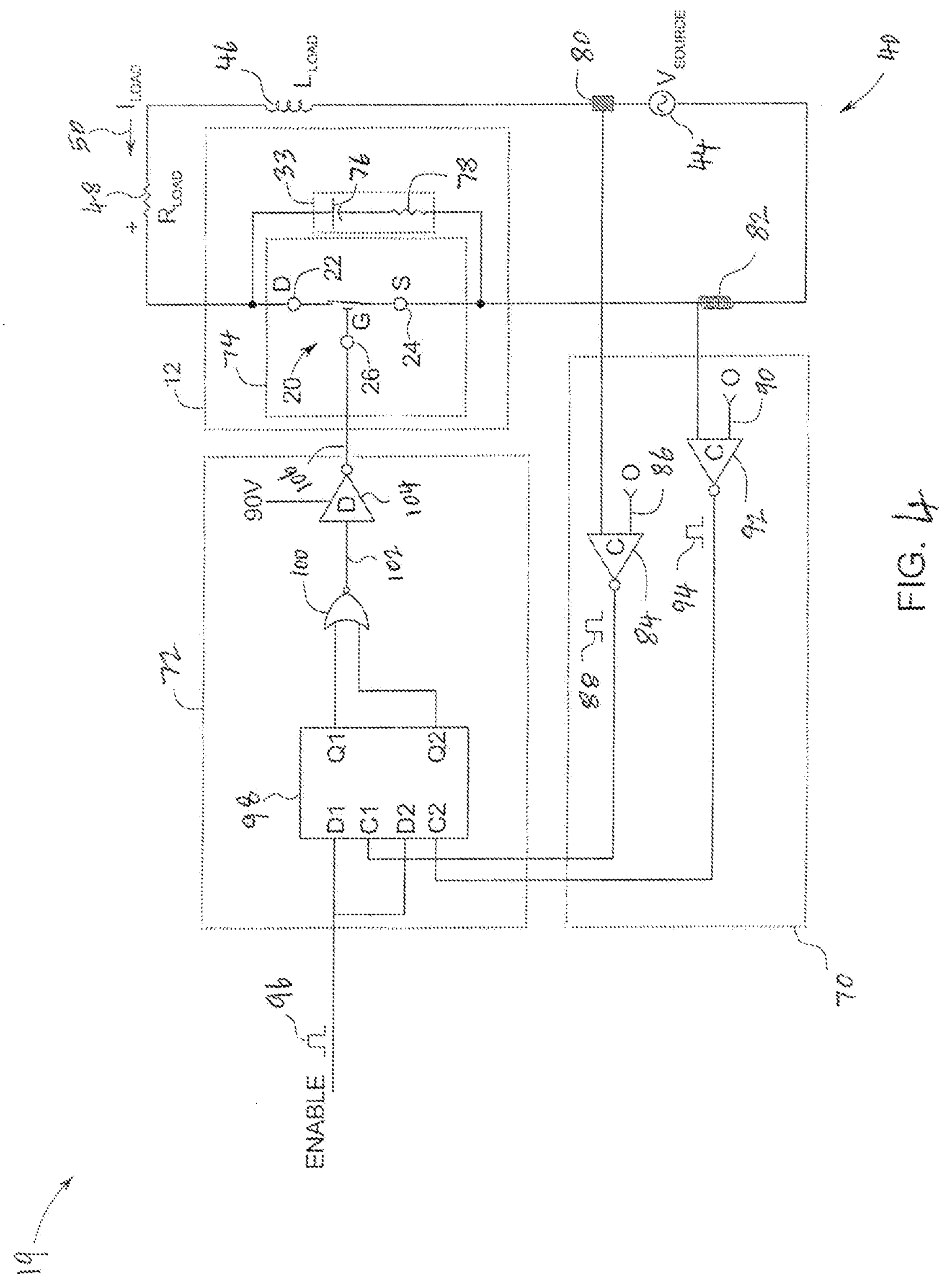
FIG. 4 is a schematic diagram, illustrating the exemplary MEMS based switching system depicted in FIG. 3.

Turning to FIG. 4, a schematic diagram 19 of one embodiment of the soft switching system 11 of FIG. 3 is illustrated. In accordance with the illustrated embodiment, the schematic diagram 19 includes one example of the switching circuitry 12, the detection circuitry 70 and the control circuitry 72.

Although for the purposes of description, FIG. 4 illustrates only a single MEMS switch 20 in switching circuitry 12, the switching circuitry 12 may nonetheless include multiple MEMS switches depending upon, for example, the current and voltage handling requirements of the soft switching system 11. In an exemplary embodiment, the switching circuitry 12 may include a switch module including multiple MEMS switches coupled together in a parallel configuration to divide the current amongst the MEMS switches. In a further exemplary embodiment, the switching circuitry 12 may include an array of MEMS switches coupled in a series configuration to divide the voltage amongst the MEMS switches. In a yet further exemplary embodiment, the switching circuitry 12 may include an array of MEMS switch modules coupled together in a series configuration to concurrently divide the voltage amongst the MEMS switch modules and divide the current amongst the MEMS switches in each module. Furthermore, the one or more MEMS switches of the switching circuitry 12 may be integrated into a single package 74.

The exemplary MEMS switch 20 may include three contacts. In an exemplary embodiment, a first contact may be configured as a drain 22, a second contact may be configured as a source 24, and the third contact may be configured as a gate 26. In one embodiment, the control circuitry 72 may be coupled to the gate contact 26 to facilitate switching a current state of the MEMS switch 20. Also, in additional exemplary embodiments damping circuitry (snubber circuit) 33 may be coupled in parallel with the MEMS switch 20 to delay appearance of voltage across the MEMS switch 20. As illustrated, the damping circuitry 33 may include a snubber capacitor 76 coupled in series with a snubber resistor 78.

The MEMS switch 20 may be coupled in series with a load circuit 40, as further illustrated in FIG. 4. In a presently contemplated configuration, the load circuit 40 may include a voltage source $V_{SOURCE}$ 44, and may possess a representative load inductance $L_{LOAD}$ 46 and a load resistance $R_{LOAD}$ 48. In one embodiment, the voltage scarce $V_{SOURCE}$ 44 (also referred to as an AC voltage source) may be configured to generate the alternating source voltage and the alternating load current $I_{LOAD}$ 50.

As previously noted, the detection circuitry 70 may be configured to detect occurrence of a zero crossing of the alternating source voltage or the alternating load current $I_{LOAD}$ 50 in the load circuit 40. The alternating source voltage may be sensed via the voltage sensing circuitry 80 and the alternating load current $I_{LOAD}$ 50 may be sensed via the current sensing circuitry 82. The alternating source voltage and the alternating load current may be sensed continuously or at discrete periods for example.

A zero crossing of the source voltage may be detected through, for example, use of a comparator such as the illustrated zero voltage comparator 84. The voltage sensed by the voltage sensing circuitry 80 and a zero voltage reference 86 may be employed as inputs to the zero voltage comparator 84. In turn, an output signal 88 representative of a zero crossing of the source voltage of the load circuit 40 may be generated. Similarly, a zero crossing of the load current $I_{LOAD}$ 50 may also be detected through use of a comparator such as the illustrated zero current comparator 92. The current sensed by the current sensing circuitry 82 and a zero current reference 90 may be employed as inputs to the zero current comparator 92. In turn, an output signal 94 representative of a zero crossing of the load current $I_{LOAD}$ 50 may be generated.

The control circuitry 72, may in turn utilize the output signals 88 and 94 to determine when to change (for example, open or close) the current operating state of the MEMS switch 20 (or array of MEMS switches). More specifically, the control circuitry 72 may be configured to facilitate opening of the MEMS switch 20 in an arc-less manner to interrupt or open the load circuit 40 responsive to a detected zero crossing of the alternating load current $I_{LOAD}$ 50. Additionally, the control circuitry 72 may be configured to facilitate closing of the MEMS switch 20 in an arc-less manner to complete the load circuit 40 responsive to a detected zero crossing of the alternating source voltage.

The control circuitry 72 may determine whether to switch the present operating state of the MEMS switch 20 to a second operating state based at least in part upon a state of an Enable signal 96. The Enable signal 96 may be generated as a result of a power off command in a contactor application, for example. Further, the Enable signal 96 and the output signals 88 and 94 may be used as input signals to a dual D flip-flop 98 as shown. These signals may be used to close the MEMS switch 20 at a first source voltage zero after the Enable signal 96 is made active (for example, rising edge triggered), and to open the MEMS switch 20 at the first load current zero a tier the Enable signal 96 is deactivated (for example, falling edge triggered). With respect to the illustrated schematic diagram 19 of FIG. 4, every time the Enable signal 96 is active (either high or low depending upon the specific implementation) and either output signal 88 or 94 indicates a sensed voltage or current zero, a trigger signal 172 may be generated. Additionally, the trigger signal 172 may be generated via a NOR gate 100. The trigger signal 102 may in turn be passed through a MEMS gate driver 104 to generate a gate activation signal 106 which may be used to apply a control voltage to the gate 26 of the MEMS switch 20 (or gates in the case of a MEMS array).

As previously noted, in order to achieve a desirable current rating for a particular application, a plurality of MEMS switches may be operatively coupled in parallel (for example, to form a switch module) in lieu of a single MEMS switch. The combined capabilities of the MEMS switches may be designed to adequately carry the continuous and transient overload current levels that may be experienced by the load circuit. For example, with a 10-amp RMS motor contactor with a 6× transient overload, there should be enough switches coupled in parallel to carry 60 amps RMS for 10 seconds. Using point-on-wave switching to switch the MEMS switches within 5 microseconds of reaching current zero, there will be 160 milliamps instantaneous, flowing at contact opening. Thus, for that application, each MEMS switch should be capable of "warm-switching" 160 milliamps, and enough of them should be placed in parallel to carry 60 amps. On the other hand, a single MEMS switch should be capable of interrupting the amount of current that will be flowing at the moment of switching.

Figure 5:
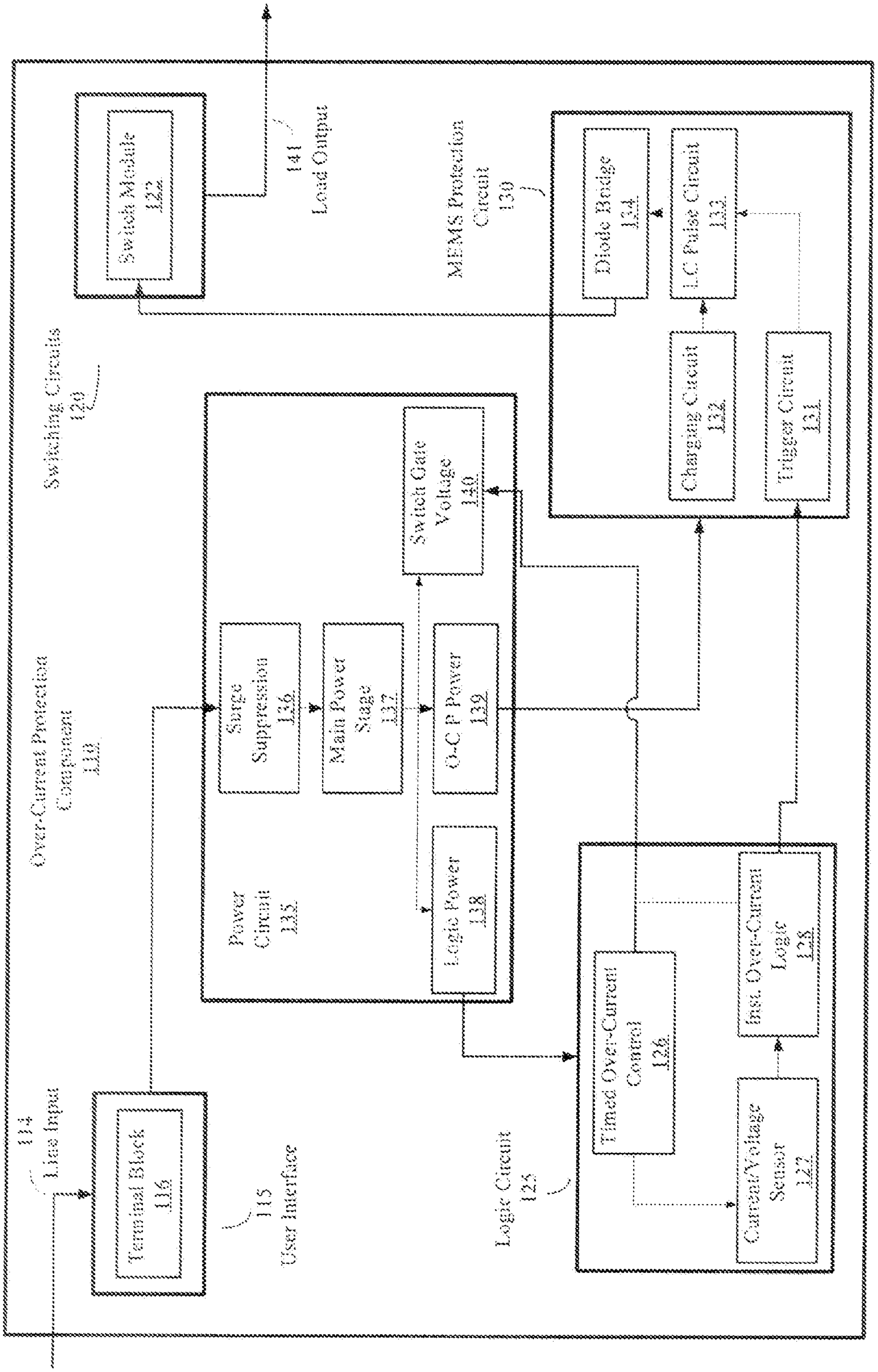
FIG. 5 is a block diagram of an exemplary MEMS based over-current protective component in accordance with an embodiment of the present invention.

FIG. 5 shows a block diagram of a MEMS based over-current protection device 110 that may be implemented within exemplary embodiments of the present invention. The device 110 receives user control inputs at the user interface 115, the user interface 115 providing a control and input interface for a user to interact with the device 110. Within the user interface 115, three-phase line power inputs 114 are received at a terminal block 116, wherein the line power input 114 is fed to the terminal block 116, and then respectively through to the power circuit 135 and the switch module 120.

User inputs can be utilized to make determinations in regard to operations such as whether to open or close the device 110 input trip levels within predetermined ranges. As such, user input can be in the form of input from a trip adjustment potentiometer, an electrical signal from a human interface (for example, from a push-button interface), or control equipment that are routed to the user interface 115. User input also can be input directly to activate a disconnect switch 117 via the terminal block 116, wherein the disconnect switch is structurally configured to provide lockable isolation of the device 110 in order to protect personnel during the service and maintenance of downstream equipment. User input is used to control the MEMS switching as well as provide user adjustability in regard to trip-time curves. The power circuit 135 performs basic functions to provide power for the additional circuits, such as transient suppression, voltage scaling & isolation, and EMI filtering.

The over-current protection device 110 further comprises logic circuitry 125, wherein the logic circuitry 125 is responsible controlling the normal operation as well as recognizing fault conditions (such as setting the trip-time curve for timed over-currents (126), allowing programmability or adjustability, controlling the closing/re-closing of specified logic (126, 128), etc. . . . ). The current/voltage sensing component 127 provides the voltage and current measurements needed to implement the required logic for over-current protection operations, and for maintaining responsibility the energy diversion circuits utilize for cold switching operations, wherein the operations are accomplished using the above mentioned charging 132 and pulse circuits 133 in addition to the diode bridge 134. The MEMS protection circuitry 130 is similar in configuration and operation to the pulse circuit 52 as described above.

Lastly, the switching circuitry 120 is implemented, wherein the switching circuit comprises a switching module 122 containing the MEMS device arrays. The switching module 122 is similar in configuration and operation to the MEMS switch 20 as described above. In further embodiments of the present invention the switching circuit 120 further comprises an isolation contactor 123, wherein the isolation contactor is utilized to isolate input line 114 to output load 141 when the over-protection current device 110 is not activated or when the over-current protection device 110 is tripped.

The over-current protection device 110 of FIG. 5 as configured has the capability to replace fuses or circuit breakers within power systems. In an exemplary embodiment, the logic circuit 125 includes some or all functional characteristics similar to those of an electronic trip unit typically employed with a circuit breaker, which includes a processing circuit responsive to signals from current and voltage sensors, logic provided by a time-current characteristic curve, and algorithms productive of trip signals, current metering information, and/or communications with an external device, thereby providing device 110 with all of the functionality of a circuit breaker with an electronic trip unit.

Within exemplary embodiments of the present invention line inputs 114 are attached to the terminal block 116 which in turn feeds a disconnect switch that feeds the switching module 120 through the isolation contactor 123, and finally out to a load output 141. The disconnect switch 117 is utilized for service disconnection in the event of needed maintenance within the device or any downstream equipment. As such, the MEMS switch enabled over-current protection device 110 provides the main switching capability and the fault interruption for the line power.

Within further exemplary embodiments of the present invention, power for the logic circuit 125 is drawn from a phase-to-phase differential and thereafter fed through to a surge suppression component 136. A main power stage component 137 distributes power at various voltages in order to feed the control logic 138, the over-current protection device charging circuits 139, and the MEMS switch gate voltages 140. A current and voltage sensor 127 feeds the timed and instantaneous over-current logic 128, which in turn controls the MEMS switch gate voltage 140 and the MEMS protection circuit's 130 triggering circuits 131.

Figure 6:
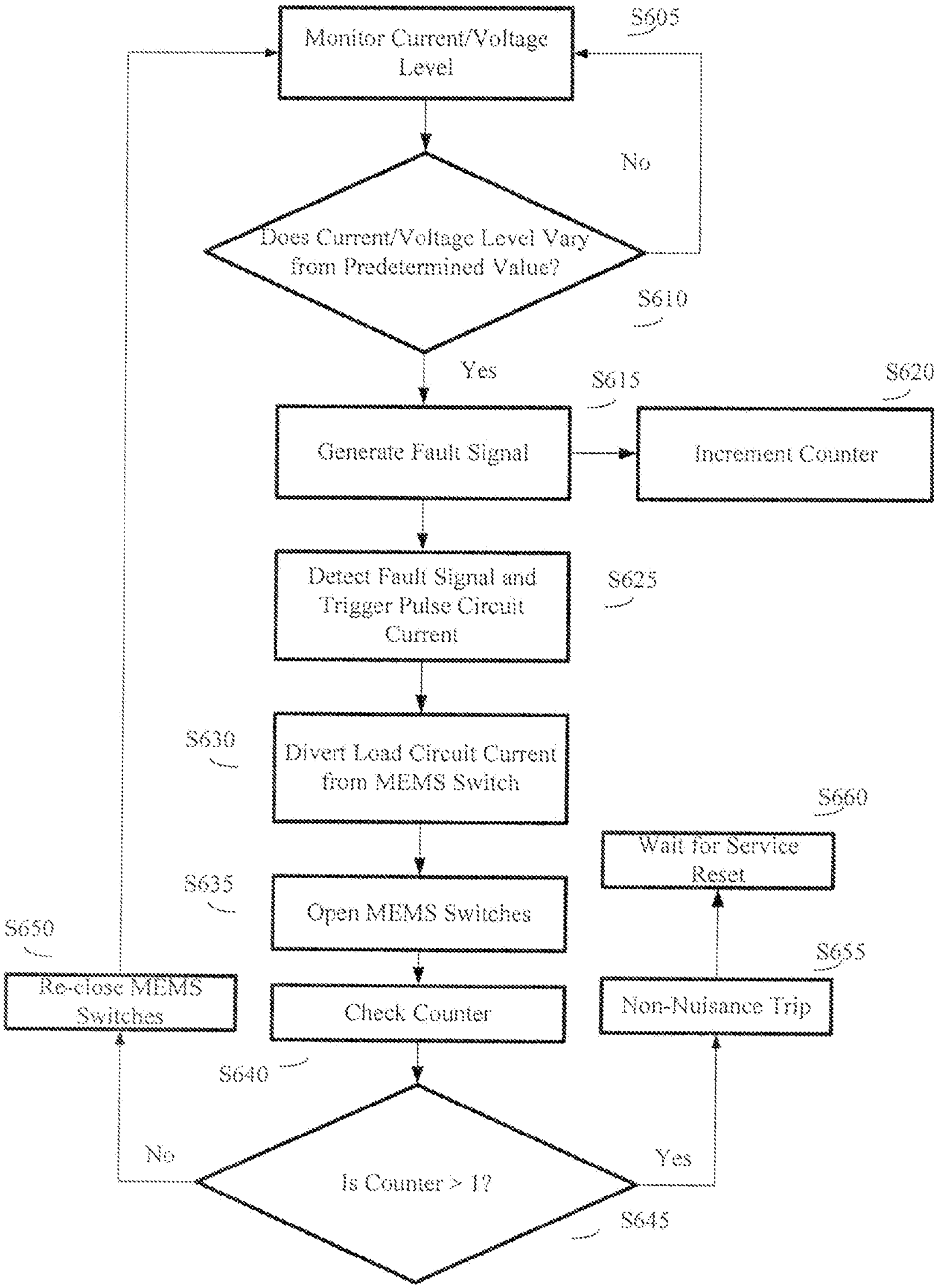
FIG. 6 is a flow diagram detailing a methodology for utilizing a MEMS enabled over-current protective component in accordance with an embodiment of the present invention.

FIG. 6 shows a flow diagram detailing the utilization of the over-current protection device 110 as a method for providing short-circuit protection and eliminating the issue of nuisance tripping. At step 605, the current/voltage sensor 127 of the over-current protection component 110 continuously monitors both the line current level and the line voltage level within a system. At step 610 a determination is made as to if the level of the current/voltage vary from a predetermined range. In the event that the current/voltage level has not varied from a prescribed range the sensor 127 continues its monitoring operations. In the event that the monitored current/voltage levels do vary from a predetermined range, a fault signal is generated at the instantaneous over-current logic 128 to indicate that a system determined variance in current/voltage level (step 615) has been detected. In conjunction with the generation of the fault signal, at step 620 a fault counter is incremented in order to track the occurrence of faults originating within a system.

At step 625 the fault signal is delivered to the trigger circuit 131, wherein the trigger circuit initiates an over-current protection pulsing operation at the MEMS protection circuit 130. The pulsing operation involves the activation of the pulse circuit 133, the activation of which results in the closing of the LC pulse circuit. Once the LC pulse circuit 133 has been closed the charging circuit 132 discharges through the balanced diode bridge 134. The pulse current through the diode bridge 134 creates a resulting short across the MEMS array switches of the switching module 122 and diverts the load current into the diode bridge and around the MEMS array (step 630) (see FIGS. 2 and 5). Under the protective pulse operation, the MEMS switches of the switch module 122 can be opened with a zero or close to zero current (step 635).

After the opening of the MEMS switches at step 635, at step 640 the incremental fault count information that has accumulating within a system is retrieved. At step 645 a determination is made as to if the resultant trip action was the result of a non-nuisance trip or a nuisance trip action that may have been caused by detected noise on the power line. In the event that the fault count is less than one (1), then a determination is made that the resulting trip was a nuisance trip (step 650), then the component will close (or reset) the MEMS switches and continue its current/voltage monitoring operations, in the event that the fault count is greater than one (1), then a determination is made that the resulting trip was a non-nuisance trip (step 655), and then at step 660 the component will leave the MEMS switches open and wait for switch resetting services.

The present invention provides enhanced protection as compared to current fuses and circuit breaker devices and can be completely implemented in place of the fore-mentioned devices. While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed:

1. A method for over-current protection, the method comprising:

monitoring a load current value of a load current passing through a plurality of micro-electromechanical switching system devices;

determining if the monitored load current value varies from a predetermined load current value;

generating a fault signal in the event that the monitored load current value varies from the predetermined load current value;

diverting the load current from the plurality of micro-electromechanical switching system devices in response to the fault signal;

opening the plurality of micro-electromechanical switching system devices in response to the diverting; and determining if the variance in the load current value was due to a true fault trip or a false nuisance trip.

2. The method of claim 1, wherein if it is determined that the variance in the load current value was due to a true fault trip, then the switches of the micro-electromechanical switching devices will remain open.

3. The method of claim 2, wherein if it is determined that the variance in the load current value was due to a false nuisance trip, then the switches of the micro-electromechanical switching devices will be closed.

4. The method of claim 3, further comprising monitoring a load voltage value.

5. The method of claim 4, further comprising determining if the monitored load voltage value varies from a predetermined load voltage value.

6. The method of claim 5, further comprising generating a fault signal in the event that the monitored load voltage/current value varies from the predetermined load voltage value.

7. The method of claim 6, further comprising determining if the variance in the load voltage/current value was due to a true fault trip or a false nuisance trip.

8. The method of claim 1, further comprising initiating a pulse circuit current in response to the generated fault signal.

9. The method of claim 8, where in response to the diversion of the load current the switches of the plurality of micro-electromechanical switching devices are opened.

10. An over-current protective device for electrical distribution systems, the device comprising:

a user interface, wherein the user interface is configured to receive input control commands, the user interface further comprising a terminal block and a disconnect switch, the terminal block being in communication with the disconnect switch;

a logic circuit in communication with the user interface;

a power stage circuit in communication with the logic circuit;

a MEMS protection circuit in communication with the logic circuit and the power stage circuit; and a switching circuit in communication with the MEMS protection circuit, the switching circuit comprising a plurality of micro-electromechanical system switching devices; wherein, the logic circuit is disposed to monitor a load current or load voltage, and in response to the monitored load current or load voltage varying from a predetermined value, the logic circuit is configured to generate and transmit a fault signal to the MEMS protection circuit and determine if the monitored current or voltage was in response to a true fault trip or a false nuisance trip;

the MEMS protection circuit is disposed to divert a load current from micro-electromechanical system switching devices in response to the fault signal; and the switching circuit is configured to open the plurality of micro-electromechanical switching system devices in response to diversion of the load current by the MEMS protection circuit.

11. The device of claim 10, wherein the plurality of micro-electromechanical system switching devices of the switching circuit are in communication with the disconnect switch of the user interface.

12. The device of claim 10, where the micro-electromechanical system switches are opened in response to the diversion of the load current.

13. The device of claim 12, wherein the switching circuit further comprises an isolator contactor that is in communication with the plurality of micro-electromechanical system switching devices, the isolator contactor being configured to isolate a line to a load in response to the switches of the plurality of micro-electromechanical system switching devices being in an open position.

14. The device of claim 13, wherein if it is determined that the varying in the current load value was due to a true fault trip, then the switches of the micro-electromechanical switching devices will remain open.

15. The device of claim 14, wherein if it is determined that the varying in the current load value was due to a false nuisance trip, then the switches of the micro-electromechanical switching devices will be closed.

* * * * *